United States Patent [19]

Chen et al.

[11] 4,129,715

[45] Dec. 12, 1978

[54] POLYESTER AMIDES SUITABLE FOR INJECTION MOLDING

[75] Inventors: Augustin T. Chen, Cheshire; William J. Farrissey, Jr., Northford; Robert G. Nelb, II, North Haven, all of Conn.

[73] Assignee: The Upjohn Company, Kalamazoo, Mich.

[21] Appl. No.: 869,705

[22] Filed: Jan. 16, 1978

Related U.S. Application Data

[63] Continuation-in-part of Ser. No. 803,027, Jun. 3, 1977, abandoned.

[51] Int. Cl.$^2$ .................... C08G 18/12; B29F 1/08; C08G 18/34
[52] U.S. Cl. .................................. 528/67; 528/48; 528/51; 528/84; 528/906
[58] Field of Search .................. 260/75 TN, 77.5 R

[56] References Cited

U.S. PATENT DOCUMENTS

| | | | |
|---|---|---|---|
| 3,317,480 | 5/1967 | Fetscher et al. | 260/77.5 R |
| 3,419,510 | 12/1968 | Hudak | 260/75 TN |
| 3,577,380 | 5/1971 | Binder | 260/77.5 R |
| 3,810,956 | 5/1974 | Kimura et al. | 260/75 TN |
| 3,836,491 | 9/1974 | Taft et al. | 260/75 TN |
| 3,843,587 | 10/1974 | Keating et al. | 260/77.5 R |
| 3,922,295 | 11/1975 | Tilley | 260/77.5 R |
| 3,928,290 | 12/1975 | Cohen et al. | 260/75 TN |

*Primary Examiner*—H.S. Cockeram
*Attorney, Agent, or Firm*—Denis A. Firth; John Kekich

[57] ABSTRACT

Substantially linear, segmented polyester amides are described which contain aromatic residues in the "hard" segments but which still possess sufficiently low melt properties to be injection moldable. The polyester amides are obtained by reacting a carboxylic acid-terminated prepolymer (derived by reacting an excess of a dicarboxylic acid with a polymeric diol of molecular weight 400 to 4000) with a stoichiometric amount of methylenebis(phenyl isocyanate) or toluene diisocyanate or mixtures of these isocyanates and, optionally, a dicarboxylic acid.

14 Claims, No Drawings

POLYESTER AMIDES SUITABLE FOR INJECTION MOLDING

CROSS-REFERENCE TO RELATED APPLICATION

This application is a continuation-in-part of application Ser. No. 803,027 filed June 3, 1977 and now abandoned.

BACKGROUND OF THE INVENTION

1. Field of the Invention

This invention relates to polyester amides and to methods of preparation thereof and is more particularly concerned with polyester amides derived from a carboxylic acid terminated polyester prepolymer and methylenebis(phenyl isocyanate) and or toluene diisocyanate, and with processes for the preparation of said polyester amides.

2. Description of the Prior Art

The term polyester-amide is commonly employed to cover a diverse group of polymers which are characterized by the presence of recurring amide and ester linkages in the molecule thereof. The members of this group have been investigated hitherto largely in regard to formation of fibers and films. To the best of the present inventors' knowledge, no polyester-amides have been described which are capable of being processed by injection molding techniques to give molded articles having sufficiently satisfactory physical properties (including resistance to degradation at high temperatures) to enable them to be used as seals, gaskets, bushings, and in like applications for thermoplastic elastomeric polymers.

A number of instances have been reported in which segmented polyester-amides have been prepared in order to provide polymers, useful primarily for fiber formation, in which the requisite balance has been sought between the physical properties contributed by the "soft" polyol segments and the "hard" polyamide segments. Illustratively, British Pat. No. 1,170,300 describes the preparation of segmented polyester amides by reaction of the acid chlorides of carboxy-terminated polyesters with a series of relatively complex diamines which contain a plurality of amide linkages. U.S. Pat. No. 3,044,987 describes the preparation of fiber-forming segmented polyester amides by the reaction of the acid halide of a carboxy-terminated polyester with a simple diamine and, optionally, a difunctional acid halide. The resulting polymers contain "soft" segments derived from the polyol residue and "hard" segments derived from the diamine. It is apparent from the specific examples given in the reference that polymers having relatively low melt temperatures (of the order of 250° C.) or less are obtained provided no aromatic moieties are introduced into the soft or hard segments of the polymers. However, introduction of an aromatic moiety, specifically the terephthalic acid residue, into either the soft or hard segments gives polymers having melt temperatures in excess of 300° C. which renders them incapable of being processed by injection-molding techniques.

In order to produce polyester-amides which will have sufficient structural strength properties to produce useful articles by injection-molding techniques it is highly desirable to be able to introduce aromatic residues into the soft and or hard segments. But this has to be achieved without raising the melt temperature of the polymer above about 280°–300° C. otherwise the polymer is no longer moldable by injection molding techniques.

We have now found that these various objectives can be attained by employing very carefully selected combinations of reactants and reaction conditions in the preparation of the polyester-amides as will be described in detail hereinbelow.

SUMMARY OF THE INVENTION

This invention comprises substantially linear, segmented, thermoplastic polyester-amides characterized by a recurring unit of the formula:

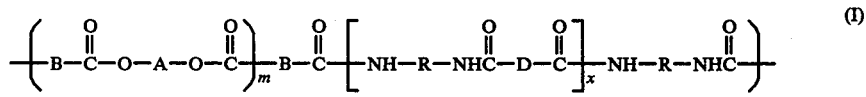

wherein R is selected from the class consisting of arylene of the formulae:

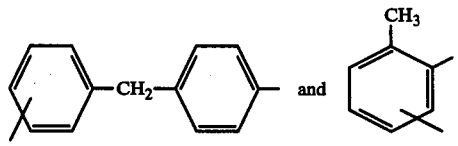

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, isophthalic and terephthalic acids, and mixtures thereof, m has a mean value of less than 1.0 and greater than 0, D is the residue of at least one dicarboxylic acid HOOC—D—COOH such that the melt temperature of the hard segment, of which it forms a part, is not greater than 280°–300° C. and x is a number having an average value from 0 to 10.

The invention also comprises a process for the preparation of polyester amides characterized by the above recurring unit (I).

The term "aliphatic dicarboxylic acids having from 6 to 14 carbon atoms" means the acids represented by the formula HOOC—$C_nH_{2n}$—COOH wherein the total number of carbon atoms, including those in the carboxylic groups, liess within the stated range and $C_nH_{2n}$ represents straight or branched chain alkylene having the appropriate carbon atom content. Illustrative of such acids are adipic, pimelic, suberic, azelaic, sebacic, 1,11-undecandioic and 1,12-dodecandioic, α-methyladipic, α,α-dimethyladipic, α-ethylpimelic, α-ethylα-methylpimelic, β,β'-diethyl-β,β'-dimethylsuberic, 2,2,4-trimethyladipic, 2,4,4-trimethyladipic, α,α-dimethylazelaic, and α,α,α',α'-tetramethylsebacic acids.

The term "polymeric diol" is inclusive of polyether and polyester diols having molecular weights within the stated range as will be discussed further and exemplified hereinafter.

The dicarboxylic acid represented by the formula HOOC—D—COOH is a dicarboxylic acid or a mixture of two or more dicarboxylic acids the nature of which will be discussed in more detail hereinafter.

DETAILED DESCRIPTION OF THE INVENTION

The polyester amides of the invention are prepared by a two step procedure. In the first step of the procedure there is prepared a carboxylic acid-terminated polyester by reacting at least 2 molar proportions of a dicarboxylic acid HOOC—B—COOH (II), wherein B is as hereinbefore defined, or a mixture of two or more such acids (II), with 1 molar proportion of a polymeric diol HO-A-OH (III) having a molecular weight within the range stated above. Preferably the proportion of dicarboxylic acid (II) is in excess of 2 moles per mole of diol (III) and a particularly preferred proportion is within the range of about 2.1 moles to about 2.4 moles of acid (II) per mole of diol (III).

The preparation of the carboxylic acid-terminated polyester prepolymer is carried out in accordance with procedures well-known in the art for such prepolymers. Illustratively, the free acid (II) and the polymeric diol (III) are heated in the presence of a solvent such as toluene, xylene, and the like, and the water of condensation is removed azeotropically from the reaction mixture. If desired, an esterification catalyst such as antimony trioxide, p-toluene sulfonic acid, calcium acetate, and the like, can be employed but the use of catalysts of this nature is generally unnecessary except in a few instances in which the esterification proceeds slowly. When the amount of water of condensation removed from the reaction mixture corresponds to the theoretically calculated quantity, i.e. two moles for each mole of diol (III), the carboxylic acid-terminated prepolymer is isolated by removing the solvent by distillation, advantageously under reduced pressure.

The dicarboxylic acids (II) employed in the preparation of the carboxy-terminated prepolymers can be any of the aliphatic dicarboxylic acids having from 6 to 14 carbons as defined and exemplified above.

The polymeric diols (III), employed in the preparation of the carboxylic acid-terminated prepolymers as described above, can be any polyether or polyester diols having molecular weights within the stated range. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like and copolymers of said alkadienes with vinyl monomers such as acrylonitrile, methacrylonitrile, styrene, and the like. Particularly preferred polyether diols for use in preparing the polyester amides of the invention are poly(tetramethylene glycol) and ethylene oxide capped polypropylene glycols wherein the ethylene oxide content is within the range of about 5 percent to about 40 percent.

Illustrative of the polyester diols are those obtained by reacting a dicarboxylic acid such as adipic, suberic, azelaic, glutaric acids and the like, with an excess, over the stoichiometric amount, of a dihydric alcohol such as ethylene glycol, propylene glycol, 1,4-butanediol, and the like, including mixtures of two or more such diols.

The carboxylic acid-terminated prepolymer obtained as described above is then reacted with the appropriate diisocyanate $R(NCO)_2$, wherein R is as hereinbefore defined, to form the polyester-amide characterized by the recurring unit (I) in which the value of x is 0. The prepolymer and the diisocyanate are employed in substantially equimolar quantities. Advantageously, but not necessarily, the reaction is carried out in the presence of an inert organic solvent in which the reactants are soluble. By "inert organic solvent" is meant an organic solvent which does not enter into reaction with any of the reactants or with the product and which does not interfere with the desired course of the reaction in any other way. Illustrative of inert organic solvents are tetramethylenesulfone, dichlorobenzene, monochlorobenzene, α-butyrolactone, N-methylpyrrolidone, N,N-dimethylformamide, N,N-dimethylacetamide, xylene, and the like including mixtures of two or more such solvents.

The reaction between the prepolymer and the diisocyanate is carried out advantageously at elevated temperatures in the range of about 100° C. to about 250° C. and most advantageously in the range of about 150° C. to about 170° C. The reaction is assisted in most cases by the inclusion in the reaction mixture of a catalyst for the reaction between isocyanato and carboxylic acid groups. Any of the catalysts known in the art for this purpose can be employed such as the alkali metal alkoxides (as described in U.S. Pat. No. 4,001,186), the N-alkali metal lactamates (disclosed in pending U.S. application Ser. No. 521,745 filed Nov. 7, 1974, now U.S. Pat. No. 4,021,412), the phospholene-1-oxides or 1-sulfides (described in U.S. Pat. Nos. 2,663,737-8) and the phospholane-1-oxides or 1-sulfides (described in U.S. Pat. No. 2,663,739). A particularly preferred group of catalysts comprises 1,3-dimethyl-2-phospholene-1-oxide, 1,3-dimethyl-3-phospholene-1-oxide and mixtures of these two isomers.

The above catalysts are generally employed in amounts corresponding to about 0.001 percent to about 0.5 percent by weight of total reactants and preferably in amounts corresponding to about 0.02 percent to about 0.2 percent by weight of total reactants.

The progress of the reaction between the carboxylic acid-terminated prepolymer and the diisocyanate is readily followed by conventional techniques such as infrared or nuclear magnetic resonance spectroscopy. The end point of the reaction is determined by disappearance of absorption bands characteristic of the carboxylic acid group.

When the reaction is determined to be complete, by techniques such as those mentioned above, the desired polyester amide can be recovered from the reaction mixture by pouring the latter into a solvent such as methanol, acetone, hexane, water, and the like in which the polymer is insoluble. The polymer generally precipitates in the form of strands which quickly solidify and which can be comminuted by any of the known techniques such as crushing, pelletizing, and the like. The polymer, either before or after comminution, can be washed, if desired, with appropriate solvents and then dried using conventional procedures.

In a particular embodiment of the process of the invention there is included in the reaction mixture, in addition to the carboxylic acid-terminated prepolymer and diisocyanate, a dicarboxylic acid HOOC—D—

COOH (IV) or a mixture of two or more such acids. Advantageously, the dicarboxylic acid (IV) is a straight chain aliphatic dicarboxylic acid having from about 6 to about 9 carbon atoms (inclusive of those in the carboxylic groups) but other dicarboxylic acids can be employed provided that the acids are such that the melt temperature of the hard section of the polymer into which the said acid is introduced is not raised thereby above about 280°-300° C. Illustrative of dicarboxylic acids (IV) which can be employed in this embodiment are adipic, azelaic, sebacic, suberic, and trimethyladipic acids. Particularly preferred are azelaic and adipic as well as a mixture of approximately equimolar amounts of these two acids.

The proportion in which the dicarboxylic acid or mixture of acids (IV) is introduced into the polymers of the invention is advantageously not greater than about 10 mole per mole of prepolymer and preferably is in the range of about 0 mole to about 3 mole per mole of prepolymer. The amount of dicarboxylic acid (IV) introduced is such that the total weight of the hard segments (including the residue of the carboxylic acid groups derived from the carboxylic acid-terminated prepolymers) does not exceed 85 percent by weight of the total polymer and preferably the weight of the hard segment lies in the range of about 30 to about 60 percent by weight of the total polymer. As will be obvious to one skilled in the art the proportion of diisocyanate employed in the reaction mixture is required to be increased, in proportion to the amount of dicarboxylic acid or acids (IV) which is introduced into the reaction mixture, in order to maintain the overall ratio of isocyanate groups to carboxylic acid groups in the range of 1:1.

In carrying out the embodiment of the invention in which the dicarboxylic acid (IV) is included as a reactant the procedure adopted is substantially the same as that described above for carrying out the reaction between the diisocyanate and the carboxylic acid-terminated prepolymer.

In an alternative embodiment of the invention, polyesteramides are prepared as described above but replacing the carboxy-terminated prepolymers by a carboxy-terminated copolymer of butadiene and acrylonitrile or like vinyl monomer. Illustrative of the carboxy-terminated and copolymers are those available under the trade name Hycar.

The diisocyanates R(NCO)$_2$ which are employed in preparing the polyester-amides of the invention are inclusive of 4,4'-methylenebis(phenyl isocyanate), 2,4'-methylenebis(phenyl isocyanate), 2,4-toluene diisocyanate, 2,6-toluene diisocyanate, and mixtures of any two or more of these diisocyanates. A preferred diisocyanate is 4,4'-methylenebis(phenyl isocyanate) alone or in admixture with up to 50 percent by weight of 2,4-toluene diisocyanate.

The polyester-amides of the invention have melt temperatures of the order of 280°-300° C. or less and are ideally suited for injection molding or compression molding to produce articles such as bushings, seal faces, compressor vanes and impellers, pistons and piston rings, gears, thread guides, cams, brake linings, clutch faces, abrasive articles and the like. The physical properties, particularly the structural strength and heat resistance, of the injection molded articles are very satisfactory for the various uses outlined above.

The finding that aromatic moieties can be included in the polyester-amides of the invention without significant increase in the melt index is surprising in view of the known behaviour of very closely related polyester-amides into which aromatic residues have been introduced. The polyester-amides characterized by the recurring unit (I) are a small and particular class of polymers which have been found to be capable of being processed by injection molding techniques and which possess excellent physical properties which latter are not reduced or affected by the molding thereof into articles of various kinds.

The following examples describe the manner and process of making and using the invention and set forth the best mode contemplated by the inventors of carrying out the invention but are not to be construed as limiting.

EXAMPLE 1

A. A mixture of 288.7 g. (0.437 mole) of poly(tetramethylene glycol) [Teracol 650: DuPont: M.W. = 660.8], 94.57 g. (0.502 mole) of azelaic acid, 74.43 g. (0.0502 mole) of adipic acid and 400 ml. of xylene was heated under reflux. The water eliminated in the condensation was removed continuously from the reaction mixture using a Dean-Stark apparatus. After continuing the refluxing for 24 hours, at which time no further water was being eliminated, the reflux condenser was replaced by a Soxhlet extractor filled with molecular sieves. The refluxing was then continued for a further 16 hours at the end of which the xylene was removed under reduced pressure. The last traces of xylene were removed in vacuo. There was thus obtained a carboxylic acid terminated prepolymer having an acid number (by titration) of 136 and corresponding to the formula:

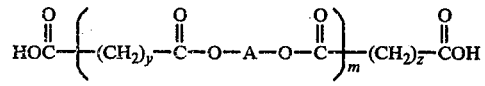

wherein A is the residue of the tetramethylene glycol, m has an average value of 0.86 and y and z each simultaneously or separately represent 4 or 7.

B. A mixture of 120.4 g. (0.292 equiv.) of the prepolymer so obtained, 310 ml. of dry tetramethylene sulfone and 0.1 g. of 1,3-dimethylphospholene-1-oxide was heated to 160° C. To this mixture was added, dropwise with stirring, a total of 37.52 g. (0.298 equivs.) of 4,4'-methylenebis(phenyl isocyanate) in 175 ml. of anhydrous tetramethylene sulfone. The reaction mixture was maintained under an atmosphere of nitrogen throughout and the temperature was maintained at approximately 160° C. throughout the addition (approximately 3 hours). After the addition was complete, the reaction mixture was maintained at 160° C. with stirring for a further hour and then a solution of 0.74 g. of 4,4'-methylenebis(phenyl isocyanate) in 2 ml. of tetramethylene sulfone was added. The resulting mixture was maintained at the same temperature with stirring for a further hour before being poured into 1.5 gallons of acetone. The solvent was decanted from the white elastomeric material which had separated and the latter was chopped into small pieces in methanol and was washed by maintaining in methanol for 24 hours. The material so obtained was isolated by filtration and dried in a vacuum oven at 120° C. for 16 hours. There was thus obtained a polyester-amide having an inherent viscosity (0.5 g./100 ml. in dimethylformamide at 30° C.) of 0.88 and having a recurring unit of the formula:

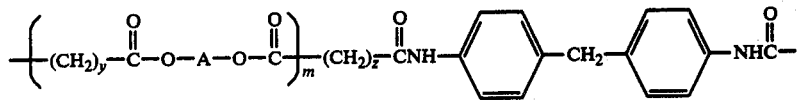

wherein A is the residue of the tetramethylene glycol, and a recurring unit of the formula:

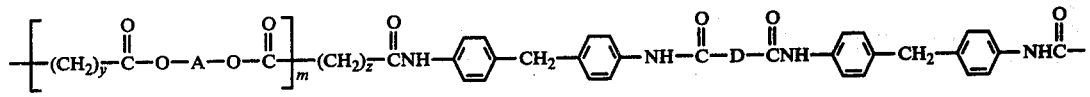

m, y, and z have the significance defined in Part A above.

This polymer was readily compression molded at 200° C. to yield a clear yellow sheet (4½ inches × 5½ inches) which was found to have the following physical properties:
Hardness: Shore A: 88
Modulus at
    100% elongation: 1106 psi
    300% elongation: 1323 psi
Elongation at break: 500%
Tensile Strength: 1423 psi
Tensile Set: 123%

EXAMPLE 2

Using the procedure described in Example 1, Part A, but replacing the polytetramethylene glycol there employed by 991.1 g. (0.501 mole) of a polyoxypropylene glycol capped with ethylene oxide (Poly-G-X53-56; M.W. = 1978.8; 11% ethylene oxide residues; Olin) and increasing the amounts of azelaic acid and adipic acid to 108.41 g. (0.576 mole) and 84.18 g. (0.576 mole), respectively, there was obtained a carboxylic acid terminated prepolymer having an acid number of 70 and corresponding to the formula:

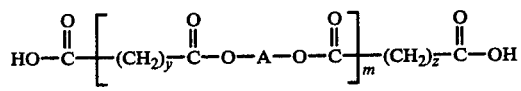

wherein A is the residue of the ethylene oxide capped polyoxypropylene glycol, m has an average value of 0.70 and y and z each simultaneously or separately represent 4 or 7.

A mixture of 147.89 g. (0.185 equiv.) of the above prepolymer, 6.75 g. (0.0923 equiv.) of adipic acid, 8.68 g. (0.0923 equiv.) of azelaic acid, 0.23 g. of 1,3-dimethylphospholene-1-oxide and 450 ml. of anhydrous tetramethylene sulfone was heated to 165° C. and stirred under an atmosphere of nitrogen while a total of 46.5 g. (0.369 equiv.) of 4,4'-methylenebis(phenyl isocyanate) in 200 ml. of anhydrous tetramethylene sulfone was added dropwise over a period of 3 hours. The temperature of the reaction mixture was maintained at circa 165° C. throughout the addition and then for a period of four hours thereafter. At the end of each of the first 3 hours, a solution of 0.93 g. of 4,4'-methylenebis(phenyl isocyanate) in 2 ml. of anhydrous tetramethylene sulfone was added. At the end of the 4 hour period the reaction mixture was poured into 3 gallons of water. The precipitated polymer was chopped and then soaked in methanol for 24 hours. The washed material was dried in vacuo at 120° C. for 16 hours. There was thus obtained a polyester amide having an inherent viscosity (0.5 g./100 ml. in N-methylpyrrolidone at 30° C.) of 1.1

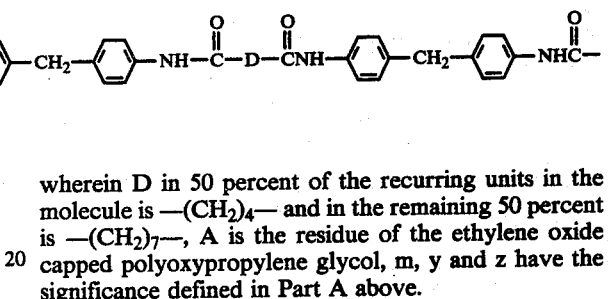

wherein D in 50 percent of the recurring units in the molecule is —(CH$_2$)$_4$— and in the remaining 50 percent is —(CH$_2$)$_7$—, A is the residue of the ethylene oxide capped polyoxypropylene glycol, m, y and z have the significance defined in Part A above.

The polymer was readily compression molded at 220° C. to a clear light yellow sheet (4½ inches × 5½ inches) having the following physical properties:
Hardness: Shore A: 73
Modulus at
    100%: 1056 psi
    300%: 1270 psi
Elongation at break: 588%
Tensile strength: 2416 psi
Tensile set: 65%

EXAMPLE 3

Using the procedure described in Example 1, Part A, but replacing the polytetramethylene glycol there used by 920.2 g. (0.944 mole) of polyethylene glycol (Poly-G 1000; Olin: M.W. = 975) and increasing the amounts of azelaic and adipic acids to 204.29 g. (1.085 mole) and 158.62 g. (1.085 mole), respectively, there was obtained a carboxylic acid terminated prepolymer having an acid number of 108 and having the formula:

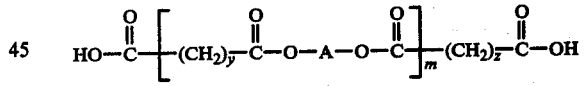

wherein A is the residue of the polyethylene glycol, m has an average value of 0.82 and y and z each, simultaneously or separately, represent 4 or 7.

A mixture of 172.43 g. (0.332 equiv.) of the prepolymer prepared as described above and 500 ml. of o-dichlorobenzene was heated to 165° C. and 0.87 g. of 1,3-dimethylphospholene-1-oxide was added. The resulting mixture was stirred and maintained under an atmosphere of nitrogen at circa 165° C. while a total of 41.83 g. (0.332 equiv.) of 4,4'-methylenebis(phenyl isocyanate) in 175 ml. of o-dichlorobenzene was added dropwise over a period of 3 hours. When the addition was completed, the mixture was maintained at the above temperature with stirring for a further hour. At the end of this time 0.84 g. of 4,4'-methylenebis(phenyl isocyanate) in 2 ml. of o-dichlorobenzene was added and the reaction mixture was heated for a further one hour before being poured into 2 gallons of n-hexane. The resulting product was allowed to stand overnight before chopping the white elastomeric material and allowing the chopped material to soak in n-hexane for 17 hours. At the end of this time the polymer was isolated by filtration and dried in vacuo at 120° C. for 16 hours. There was thus obtained a polyester amide having an inherent viscosity (0.5 g./100 ml. in N-methyl pyrrolidone at 30° C.) of 0.85 and a recurring unit of the formula:

g./100 ml. in dimethylformamide at 30° C.) of 0.91 and melt temperatures at 198° C. and 218° C. The polyesteramide was characterized by the following recurring unit:

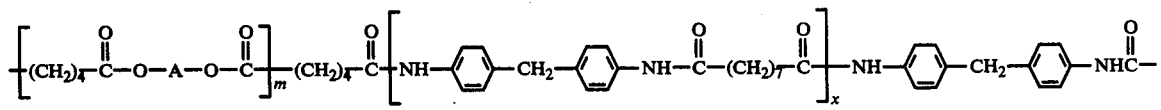

where x has an average value of 1, m has an average value of 0.81, and A is the residue of the polytetramethylene glycol. A portion of the polymer was compression molded at 225° C. into a sheet (4½ inches × 5½ inches) which was found to have the following physical properties:

Shore Hardness: 78A
Modulus:
    at 100%: 845 psi
    at 300%: 1330 psi
Ultimate tensile: 2190 psi
Elongation at break: 900%
Tensile Set: 110%

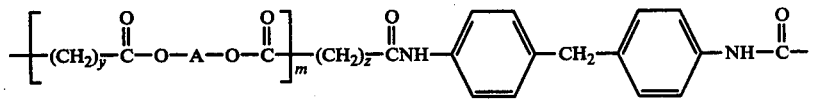

wherein A is the residue of the polyethylene glycol, and m, y and z have the significance defined in Part A.

The polymer was compression molded at 210° C. to give a translucent sheet.

EXAMPLE 4

A. A mixture of 602 g. (0.62 equiv.) of polytetramethylene glycol (Teracol 2000: eq. wt. = 959: DuPont) and 106 g. (1.452 equivs.) of adipic acid in 500 ml. of xylene was heated under reflux and the water of condensation was removed azeotropically using a Dean-Stark trap. After approximately 90 percent of the theoretical quantity of water had been collected, the Dean-Stark trap was replaced by a Soxhlet extractor containing 4A molecular sieves and refluxing was continued for a further 24 hours. At the end of this period the xylene was removed from the reaction product by distillation under reduced pressure, the last traces of xylene being removed under high vacuum. The resulting carboxylic acid-terminated prepolymer was found to have an equivalent weight of 877 by acid number analysis and was characterized by the formula:

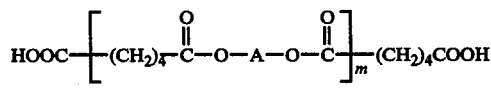

wherein A is the residue of the polytetramethylene glycol and m has an average value of 0.81.

B. A mixture of 71.9 g. (0.082 equiv.) of the carboxylic acid-terminated prepolymer obtained as described above, 7.67 g. (0.082 equiv.) of azelaic acid and 0.2 g. of 1,3-dimethylpholene-1-oxide in 250 ml. of tetramethylene sulfone was heated to 160° C. under an atmosphere of nitrogen. To the solution was added, dropwise with stirring, a solution of 20.43 g. (0.163 equiv.) of 4,4'-methylenebis(phenyl isocyanate) in 50 ml. of tetramethylene sulfone over a period of 2 hours. The mixture was heated at the above temperature for a further 5 hours with stirring during which time a total of a further 3.07 g. of 4,4'-methylenebis(phenyl isocyanate) in 15 ml. of tetramethylene sulfone was added. At the end of this period the reaction product was poured into a large excess of methanol. The polymer which separated was chopped into small pieces, washed with methanol and dried in vacuo at 120° C. There was thus obtained a polyester amide having an inherent viscosity (0.5

EXAMPLE 5

Using the procedure described in Example 4, Part A, but replacing the polytetramethylene glycol there used by an equivalent amount of a polytetramethylene glycol having an equivalent weight of 484 (Teracol 1000: DuPont) there was obtained a carboxy terminated prepolymer having an equivalent weight of 534 and characterized by the formula:

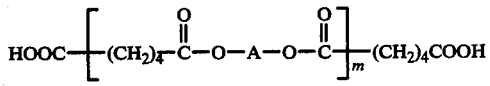

wherein A is the residue of the polytetramethylene glycol and m has an average value of 0.87.

A solution of 51.7 g. (0.097 equiv.) of the carboxy-terminated prepolymer prepared as described above and 0.8 g. of 1,3-dimethylpholene-1-oxide in 125 ml. of o-dichlorobenzene was heated to 165° C. under nitrogen. The solution was maintained at this temperature with stirring while a solution of 12.1 g. (0.097 equiv.) of 4,4'-methylenebis(phenyl isocyanate) in 50 ml. of o-dichlorobenzene was added dropwise over a period of 2.5 hours. The resulting mixture was maintained at the same temperature with stirring for a further 4 hours and a total of 30 ml. of o-dichlorobenzene containing 0.40 g. of 4,4'-methylenebis(phenyl isocyanate) was added during that time. The reaction product so obtained was poured into a large excess of methanol. The precipitated polymer was chopped, washed with methanol and dried in vacuo at 115° C. for 18 hours. There was thus obtained a polyester amide having an inherent viscosity (0.5 g./100 ml. in dimethylformamide at 30° C.) of 0.58 and a melt temperature of 285° C. The polyesteramide was characterized by the following recurring unit:

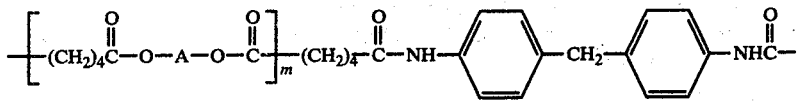

wherein A is the residue of the polytetramethylene glycol and m has an average value of 0.87.

A sample of the above polymer was compression molded at 220° C. to form a sheet (4½ inches × 5½ inches) which was found to have the following physical properties:
Shore Hardness: 78A
Modulus at 100%: 660 psi
Ultimate tensile: 943 psi
Elongation at break: 200 percent
Tensile set: 17 percent

EXAMPLE 6

Using the procedure described in Example 4, Part A, but replacing the adipic acid there used by an equivalent amount of azelaic acid, there was obtained a carboxy-terminated prepolymer having an equivalent weight of 529 and characterized by the formula:

$$HOOC\text{---}[\text{---}(CH_2)_7\text{---}\overset{O}{\overset{\|}{C}}\text{---}O\text{---}A\text{---}O\text{---}\overset{O}{\overset{\|}{C}}\text{---}]_m\text{---}(CH_2)_7COOH$$

wherein A is the residue of the polytetramethylene glycol and m has an average value of 0.81.

A solution of 87.0 g. (0.165 equiv.) of the carboxylic acid-terminated prepolymer prepared as described above and 0.2 g. of 1,3-dimethylphospholene-1-oxide in 234 ml. of tetramethylene sulfone was heated to 160° C. under an atmosphere of nitrogen and stirred while a total of 20.6 g. (0.165 equiv.) of 4,4'-methylenebis(phenyl isocyanate) in 75 ml. of tetramethylene sulfone was added dropwise over a two hour period. The resulting mixture was maintained at the above temperature with stirring for an additional six hours during which time a total of 3.08 g. (0.025 equiv.) of 4,4'-methylenebis(phenyl isocyanate) in 15 ml. of tetramethylene sulfone was added at intervals during this period. The product so obtained was poured into a large excess of methanol. The precipitated polymer was chopped, washed with methanol, and dried in vacuo. There was thus obtained a polyester-amide having an inherent viscosity (0.5 g./100 ml. in dimethylformamide at 30° C.) of 1.0 and melt temperatures at 237° C. and 250° C. A sample of the polymer was compression molded at 225° C. to obtain a sheet (4½ inches × 5½ inches) which was found to have the following properties:
Shore Hardness: 82A
Modulus
  at 100%: 1030 psi
  300%: 1300 psi
Ultimate tensile: 1360 psi
Elongation at break: 420 percent
Tensile set: 80 percent

EXAMPLE 7

A solution of 200.6 g. (0.24 equiv.) of a carboxylic acid-terminated prepolymer prepared in a duplicate run to that described in Example 4, part A, and having an equivalent weight of 837, 22.61 g. (0.24 equiv.) of azelaic acid and 0.321 g. of 1,3-dimethylphospholene-1-oxide in 407 ml. of tetramethylene sulfone and 3217 ml. of o-dichlorobenzene was heated to 160° C. with stirring under nitrogen. To the solution was added dropwise over a period of 3 hours a total of 150 ml. of a solution containing 63.52 g. (0.508 equiv.) of 4,4'-methylenebis(phenyl isocyanate) in 86 ml. of o-dichlorobenzene. The resulting mixture was heated at the above temperature with stirring for a further 3 hours before being poured into an excess of methanol. The precipitated polymer was chopped, washed with methanol and dried in vacuo at 110° C. There was thus obtained a polyester amide having an inherent viscosity (0.5 g./100 ml. in N-methylpyrrolidone at 30° C.) of 0.6 and characterized by a recurring unit of the formula:

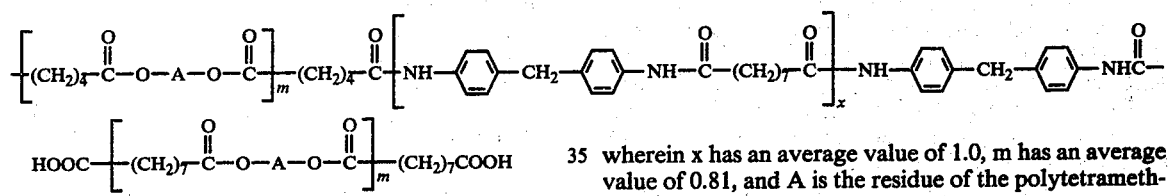

wherein x has an average value of 1.0, m has an average value of 0.81, and A is the residue of the polytetramethylene glycol.

A portion of the above polymer was compression molded at 225° C. in the form of a sheet (4½ inches × 5½ inches) which was found to have the following properties:
Shore Hardness: 85A
Modulus
  at 100%: 871 psi
  300%: 1424 psi
Ultimate tensile: 1660 psi
Elongation at break: 482 percent
Tensile set: 61 percent

EXAMPLE 8

This is a variation of the reaction procedure described in Example 7.

A solution of 200.7 g. (0.24 equiv.) of a carboxylic acid terminated prepolymer (prepared in a duplicate run to that described in Example 4, Part A, and having an equivalent weight of 837) and 22.6 g. (0.24 equiv.) of azelaic acid in 407 ml. of tetramethylene sulfone was heated to 80°-100° C. under an atmosphere of nitrogen, with stirring. A solution of 63.5 g. (0.508 equiv.) of 4,4'-methylenebis(phenyl isocyanate) in 407 ml. of o-dichlorobenzene was added followed by 0.324 g. of 1,3-dimethylphospholene-1-oxide. The resulting mixture was heated to 160° C. under nitrogen and maintained thereat for 6 hours with stirring. The reaction product so obtained was poured into an excess of methanol. The precipitated polymer was chopped, washed with methanol and dried in vacuo at 115° C. There was thus obtained a polyester amide having an inherent viscosity (0.5 g./100 ml. in N-methylpyrrolidone at 30° C.) of 0.83 and characterized by the recurring unit of the formula shown in Example 7.

A sample of the polymer was compression molded at 225° C. to obtain a sheet (4½ inches × 5½ inches) which was found to have the following properties:
Shore Hardness: 82A
Modulus
    at 100%: 864 psi
    300%: 1486 psi
Ultimate Tensile: 1998 psi
Elongation at break: 538 percent
Tensile set: 66 percent

EXAMPLE 9

Using the procedure described in Example 1, Part A, but replacing the polytetramethylene glycol there employed by 596.0 g. (0.298 mole) of a poly(tetramethylene azelate)glycol (EMERY 1693-125-R; M.W. = 2000; EMERY INDUSTRIES, INC.) and decreasing the amounts of azelaic acid and adipic acid to 64.50 g. (0.342 mole) and 50.08 g. (0.343 mole), respectively, and with 0.5 g. of p-toluene sulfonic acid monohydrate as the catalyst, there was obtained a carboxylic acid terminated prepolymer having an acid number of 63.8 and corresponding to the formula:

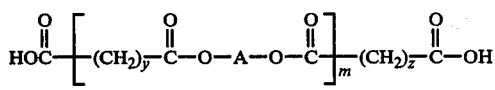

wherein A is the residue of the poly(tetramethylene azelate)glycol, m has an average value of 0.77 and y and z each, simultaneously or separately, represent 4 or 7.

A mixture of 150.34 g. (0.171 equiv.) of the above prepolymer, 16.09 g. (0.171 equiv.) of azelaic acid, 12.49 g. (0.171 equiv.) of adipic acid, 0.32 g. of 1,3-dimethylphospholene-1-oxide and 550 ml. of anhydrous tetramethylene sulfone was heated to 165° C. and stirred under an atmosphere of nitrogen while a total of 64.63 g. (0.513 equiv.) of 4,4'-methylenebis(phenyl isocyanate) in 200 ml. of anhydrous tetramethylene sulfone was added dropwise over a period of 3 hours. The temperature of the reaction mixture was maintained at circa 165° C. throughout the addition and then for a period of three hours thereafter. At the end of the heating period the reaction mixture was poured into 3 gallons of water. The precipitated polymer was chopped and then soaked in methanol for 24 hours. The washed material was dried in vacuo at 120° C. for 16 hours. There was thus obtained a polyester-amide having an inherent viscosity (0.5 g./100 ml. in N-methylpyrrolidone at 30° C.) of 1.15 and a recurring unit of the formula:

The polymer was readily molded at 245° C. to a clear light yellow sheet (4½ inches × 5½ inches) having the following physical properties:
Hardness: Shore A: 89
Modulus at
    100%: 1560 psi
    300%: 2300 psi
Elongation at break: 560%
Tensile Strength: 3100 psi
Tensile Set: 78%

EXAMPLE 10

Using the procedure described in Example 4A, a carboxylic acid-terminated prepolymer having an acid number of 68.1 was prepared from polytetramethylene glycol (Teracol 2000) and adipic acid.

A solution of 1076 g. (1.31 equiv.) of the above prepolymer and 122.9 g. (1.31 equiv.) of azelaic acid in a mixture of 2.184 l. of tetramethylene sulfone and 1 l. of o-dichlorobenzene was heated to 68° C. under nitrogen. To the mixture was added, with stirring, a total of 339 g. (2.69 equiv.) of 4,4'-methylenebis(phenyl isocyanate) in 1.184 l. of o-dichlorobenzene and 1.709 g. of 1,3-dimethylphospholene-1-oxide. The resulting mixture was heated to 160° C. for 3.25 hr. with stirring. At the end of this time a solution of 3.30 g. of 4,4'-methylenebis(phenyl isocyanate) in 50 ml. of o-dichlorobenzene was added. Stirring and heating at the above temperature was continued for an additional 1.5 hr. before pouring the reaction mixture into a large volume of cold methanol. The precipitated polymer was chopped, washed with methanol, and dried at 120° C. for 16 hours under vacuum. The resulting polyester-polyamide had an inherent viscosity (0.5 g./100 ml. in N-methylpyrrolidone at 30° C.) of 0.96. A sample of the polymer was extruded as strands (¾ inch diameter) using a Brabender vented extruder fitted with a screw of L/D ratio of 25:1 and having a compression ratio of 4:1. The temperature settings in the various zones were all 245° C. The extruded strands were then chopped, redried and injection molded using an Arburg reciprocating screw injection molding machine with a 96 seconds cycle, barrel temperature 255° C., feed temperature 255° C. and nozzle temperature 250° C. The standard ASTM tensile bars so obtained had the following properties:
Shore Hardness: 81A
Tensile Modulus: psi
    at 50%: 670
    100%: 870
    300%: 1420
Ultimate tensile: psi: 1460
Elongation %: 340
Tensile set %: 40

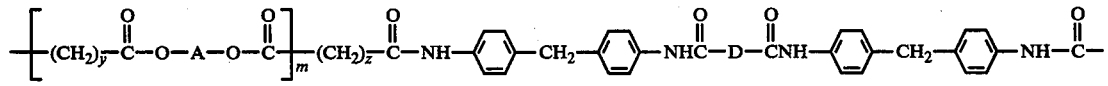

wherein D in 50 percent of the recurring units in the molecule is —(CH$_2$)$_4$— and in the remaining 50 percent is —(CH$_2$)$_7$— and A is the residue of the poly(tetramethylene azelate)glycol, m, y and z have the significance defined in the first part of this example.

EXAMPLE 11

Using the procedure described in Example 1, part A, but replacing the polytetramethylene glycol theere employed by an equivalent amount of poly(neopentyl azelate)glycol [Emery 2177-30-R; molecular weight = 2154; Emery Industries Inc.], there was obtained a carboxylic acid-terminated prepolymer having an equivalent weight of 790.

A mixture of 150.6 g. (0.1906 equiv.) of the prepolymer so obtained, 17.94 g. (0.1906 equiv.) of azelaic acid, 13.93 g. (0.1906 equiv.) of adipic acid, 0.36 g. of 1,3-dimethylphospholene-1-oxide and 585 ml. of dry tetramethylenesulfone was heated at 165° C. with stirring under an atmosphere of nitrogen. To the stirred mixture was added dropwise, over a period of 3 hours, a solution of 72.05 g. (0.5718 equivalents) of 4,4'-methylenebis(phenyl isocyanate) in 200 ml. of anhydrous tetramethylenesulfone. After the addition was complete the mixture was stirred and heated at the same temperature for 3 hours. At the end of each of the first and second hours of stirring a small portion (0.72 g.) of 4,4'-methylenebis(phenyl isocyanate) was added. At the end of this period the reaction product was poured into 2 gallons of cold water. The white polymeric material which separated was chopped into small pieces under water and then isolated by filtration and washed by soaking in 2 liters of methanol for 24 hours. The washed material was isolated by filtration, dried in vacuo at 120° C. for 24 hours and found to have an inherent viscosity (0.5 g./100 ml. in N-methylpyrrolidone at 30° C.) of 0.94.

This polyester-amide was compression molded at 250° C. to give a translucent sheet which was found to have the following physical properties:
Hardness: Shore A: 88

Modulus at
  50%: 1450 psi
  100%: 1725 psi
  300%: 2412 psi
Elongation at break: 365%
Tensile strength: 3084 psi
Tensile set: 110%

EXAMPLE 12

The preparation of the polyester-amide described in Example 9 was repeated but increasing the scale by a factor of 6.12. The polymer so obtained was found to have an inherent viscosity (0.5 g./100 ml. in N-methylpyrrolidone at 30° C.) of 1.1. The material was injection molded as follows:

An Arburg reciprocating screw injection molding machine was used. The operating conditions were:
  Barrel temperature: 260° C.
  Nozzle temperature: 240° C.
  Injection pressure: 1200 psi
  Mold temperature: 18°–20° C.
  Mold cycle: 85 seconds
Standard ASTM tensile bars were obtained by the injection molding and were found to have the following properties:
Hardness: 89 Shore A
Modulus:
  at 50%: 970 psi
  100%: 1290 psi
  300%: 2075 psi
Tensile strength: 2157 psi
Elongation at break: 310%
Tensile set: 46%

EXAMPLE 13

A mixture of 123.04 g. (0.139 equiv.) of a carboxylic acid-terminated prepolymer (prepared as described in Example 9 and having an equivalent weight of 919.6), 25.18 g. (0.268 equiv.) of azelaic acid, 19.55 g. (0.268 equiv.) of adipic acid and 550 ml. of dry tetramethylene sulfone was heated, with stirring, to 165° C. under an atmosphere of nitrogen. To this solution was added 0.37 g. of 1,3-dimethylphospholene-1-oxide followed, dropwise, by a solution of 42.14 g. (0.335 equiv.) of 4,4'-methylenebis(phenyl isocyanate) and 29.10 g. (0.335 equiv.) of 2,4-toluene diisocyanate in 200 ml. of dry tetramethylene sulfone. When the addition was completed, the reaction mixture was maintained at the above temperature and stirred for a further 1 hour, then, at intervals of 45 minutes, three portions, each of 2 ml., of an isocyanate solution of the same composition as above, were added. After these additions were complete, the reaction mixture was stirred for a further hour at 165° C. before being poured into 8 gallons of cold water. The solid which separated was chopped into small pieces and soaked in 1 gallon of methanol for 16 hours. The washed solid was filtered and dried in a vacuum oven at 120° C. for 16 hours. There was thus obtained a polyester-amide having an inherent viscosity of 1.1 and characterized by a recurring unit of the formula:

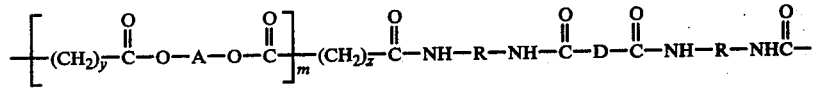

wherein R in 50 percent of the recurring units represents

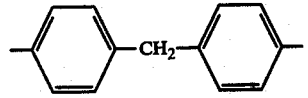

and, in the other 50 percent, represents

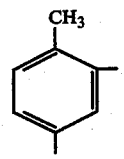

D in 50 percent of the recurring units represents —(CH$_2$)$_4$— and, in the remaining 50 percent, represents —(CH$_2$)$_7$—, A is the residue of a poly(tetramethylene azelate)glycol, and y and z each, simultaneously or separately, represent 4 or 7. A sample of the polymer was injection molded at 245° C. to give a clear sheet which was found to have the following properties.
Hardness: 90 Shore A
Modulus:
  at 50%: 1660 psi
  100%: 1970 psi
  300%: 2940 psi
Tensile strength: 3680 psi
Elongation at break: 400%
Density: 1.14 g/cc.

EXAMPLE 14

A mixture of 225.0 g. (0.236 equiv.) of a carboxylic acid-terminated prepolymer (prepared as described in Example 9 and having an equivalent weight of 950.9), 89.08 g. (0.946 equiv.) of azelaic acid and 1200 ml. of dry tetramethylene sulfone was heated to 165° C. under an atmosphere of nitrogen. To the stirred solution so obtained was added 0.75 g. of 1,3-dimethylphospholene-1-oxide followed, dropwise, by a solution of 59.63 g. (0.473 equiv.) of 2,4'-methylenebis(phenyl isocyanate) and 89.45 g. (0.709 equiv.) of 4,4'-methylenebis(phenyl isocyanate) in 150 ml. of dry tetramethylene sulfone. After the addition was complete, the mixture was stirred at the same temperature for 2 hours during which time a total of 4.5 ml. of a solution of isocyanate of the same composition as that described above was added dropwise. When this operation was complete, the reaction mixture was stirred for another hour at 165° C. before being poured into 10 gallons of cold water. The solid which separated was chopped into small pieces and soaked in 2 gallons of methanol for 16 hours. The washed polymer was isolated by filtration and dried in a vacuum oven at 115° C. for 16 hours. There was thus obtained a polyester-amide characterized by a recurring unit of the formula:

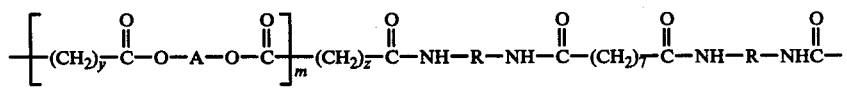

wherein R in 40 percent of the recurring units represents

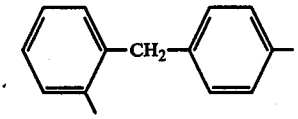

and, in the other 60 percent, represents

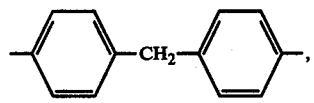

A is the residue of a poly(tetramethylene azelate)glycol, and y and z each, simultaneously or separately, represent 4 or 7. A sample of the polymer was compression molded at 230° C. in the form of a sheet (5 inches × 5 inches) which was found to have the following properties:

Hardness: 55D
Modulus:
  at 50%: 1940 psi
  100%: 2000 psi
  300%: 2870 psi
Tensile strength: 4825 psi
Elongation at break: 510%

We claim:

1. A substantially linear, segmented thermoplastic polyester-amide characterized by a recurring unit of the formula:

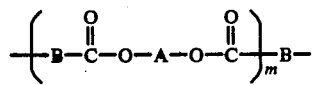

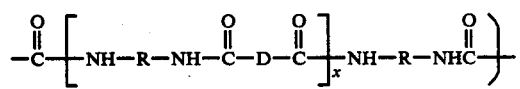

wherein R is selected from the class consisting of arylene of the formulae

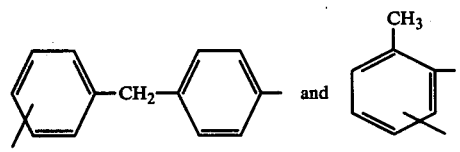

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than 1 and greater than 0, D is the residue of a dicarboxylic acid HOOC—D—COOH such that the melt temperature of the hard segment is not greater than 280° C., and x is a number having an average value from zero to 10.

2. A thermoplastic polyester-amide according to claim 1 wherein A is the residue of a polyether glycol.

3. A thermoplastic polyester-amide according to claim 2 wherein the polyether glycol is a polytetramethylene glycol.

4. A thermoplastic polyester-amide according to claim 2 wherein the polyether glycol is a polypropylene glycol capped with ethylene oxide.

5. A thermoplastic polyester-amide according to claim 1 wherein D is the residue of a mixture of approximately equivalent quantities of adipic and azelaic acids.

6. A thermoplastic polyester-amide according to claim 1 wherein D is the residue of azelaic acid.

7. A thermoplastic polyester-amide according to claim 1 wherein A is the residue of a polyester glycol.

8. A thermoplastic polyester-amide according to claim 7 wherein the polyester glycol is a poly(tetramethylene azelate)glycol having a molecular weight of about 2000.

9. A thermoplastic polyester-amide according to claim 1 wherein B is the residue of adipic acid.

10. A thermoplastic polyester-amide according to claim 1 wherein B is the residue of azelaic acid.

11. A thermoplastic polyester-amide according to claim 1 wherein B is the residue of a mixture of approximately equimolar amounts of azelaic and adipic acids.

12. A thermoplastic polyester-amide according to claim 1 wherein R represents

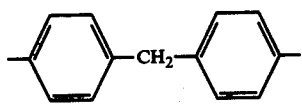
13. A thermoplastic polyester-amide according to claim 1 wherein R in 50 percent of the recurring units represents
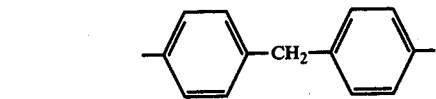
and, in the remaining 50 percent of the recurring units, represents
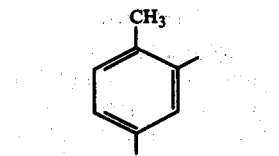
14. A thermoplastic polyester-amide according to claim 1 wherein R in 40 percent of the recurring units represents
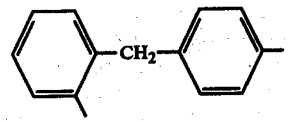
and, in the remaining recurring units, represents
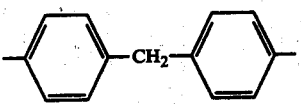
* * * * *